US012812751B2

(12) United States Patent
Liao et al.

(10) Patent No.: US 12,812,751 B2
(45) Date of Patent: Nov. 24, 2026

(54) LIGHTING MODULE CIRCUIT

(71) Applicant: HUKUI BIOTECHNOLOGY CO., LTD., Taipei City (TW)

(72) Inventors: Ming-Yi Liao, Taipei City (TW); Chun-Cing Chen, Taipei City (TW)

(73) Assignee: HUKUI BIOTECHNOLOGY CO., LTD., Taipei City (TW)

( * ) Notice: Subject to any disclaimer, the term of this patent is extended or adjusted under 35 U.S.C. 154(b) by 65 days.

(21) Appl. No.: 18/953,124

(22) Filed: Nov. 20, 2024

(65) Prior Publication Data

US 2025/0324494 A1 Oct. 16, 2025

Related U.S. Application Data

(60) Provisional application No. 63/632,532, filed on Apr. 11, 2024.

(51) Int. Cl.

| | |
|---|---|
| ***H05B 45/305*** | (2020.01) |
| ***H05B 45/10*** | (2020.01) |
| ***H05B 45/325*** | (2020.01) |
| ***H05B 47/155*** | (2020.01) |
| ***H05B 47/175*** | (2020.01) |

(52) U.S. Cl.
CPC ........... *H05B 45/305* (2020.01); *H05B 45/10* (2020.01); *H05B 45/325* (2020.01); *H05B 47/155* (2020.01); *H05B 47/175* (2020.01)

(58) Field of Classification Search
CPC .... H05B 45/305; H05B 45/10; H05B 45/325; H05B 47/155; H05B 47/175; H05B 47/19
See application file for complete search history.

(56) References Cited

U.S. PATENT DOCUMENTS

| | | | | |
|---|---|---|---|---|
| 2011/0084619 | A1* | 4/2011 | Gray | H05B 45/44 315/185 R |
| 2016/0330815 | A1* | 11/2016 | Nakagawa | A47B 96/00 |
| 2017/0215260 | A1* | 7/2017 | Cheng | H05B 45/20 |
| 2020/0383191 | A1* | 12/2020 | Chen | G11C 5/04 |
| 2021/0112189 | A1* | 4/2021 | Sun | H04N 23/71 |

* cited by examiner

*Primary Examiner* — Minh Tran

(57) ABSTRACT

A lighting module circuit comprises a light-emitting unit and a composite flicker frequency circuit. The light-emitting unit includes a plurality of light-emitting devices connected in series. The composite flicker frequency circuit has at least one input terminal, a first output terminal for outputting a first output signal with a first flicker frequency, and a second output terminal for outputting a second output signal with a second flicker frequency different from the first flicker frequency. The light-emitting unit is coupled between a power supply terminal and the second output terminal, and the first output terminal is coupled to one of the plurality of light-emitting devices.

16 Claims, 9 Drawing Sheets

LIGHTING MODULE CIRCUIT

CROSS-REFERENCE TO RELATED APPLICATION

This non-provisional application claims priority under 35 U.S.C. § 119 (e) on U.S. provisional Patent Application No. 63/632,532 filed on Apr. 11, 2024, the entire contents of which are hereby incorporated by reference.

BACKGROUND OF THE INVENTION

1. Field of the Invention

The present disclosure relates to a lighting module circuit, and in particular, to a lighting module circuit that generates composite flickering frequencies.

2. Description of the Related Art

In modern life, light-emitting device (LED) lamps have been widely used in living environments. They have the advantages of longer life time and more energy saving than traditional lamps. Different from traditional lighting fixtures, the light-emitting area of LED Lamp is composed of multiple light-emitting elements, which can produce more innovative applications through circuit design.

Phototherapy using flickering light stimulation has become a promising non-invasive neuromodulation strategy. It uses light of specific flickering frequency to stimulate cells in the body, which can alleviate neuropsychiatric diseases. Related manufacturers have developed various flickering light devices. Flickering light sources are used to induce corresponding frequencies in the brain. For example, 40 Hz light flickering therapy is an emerging treatment method for Alzheimer's disease that aims to treat neurological diseases by regulating brain wave rhythms. However, existing light sources with special flickering frequencies will cause the user's eyes to feel the irritation of flickering, and they will be unable to engage in normal life and work while receiving the stimulation.

BRIEF SUMMARY OF THE INVENTION

An objective of the present disclosure is to provide a lighting module circuit capable of controlling light-emitting devices to emit light at composite flickering frequencies. In some embodiments of the lighting module circuit, the lighting module circuit can control the light-emitting devices to emit lights at composite flickering frequencies including a first flicker frequency and a second flicker frequency. The lighting module circuit can control the light-emitting devices to emit lights at the first and second flickering frequencies with respective intensities for illumination. The illumination with reduced or without flickering can be reached by the entrained composite flickering frequencies. In this manner, the lighting module circuit is able to provide lighting that can positively stimulate users with reduced visual stress.

According to some embodiments of the present disclosure, a lighting module circuit comprises a light-emitting unit and a composite flicker frequency circuit. The light-emitting unit includes a plurality of light-emitting devices connected in series. The composite flicker frequency circuit has at least one input terminal for receiving control information, has a first output terminal for outputting a first output signal with a first flicker frequency, and a second output terminal for outputting a second output signal with a second flicker frequency different from the first flicker frequency. The light-emitting unit is coupled between a power supply terminal for receiving a power supply signal and the second output terminal of the composite flicker frequency circuit, and the first output terminal of the composite flicker frequency circuit is coupled to one of the plurality of light-emitting devices of the light-emitting unit.

According to some embodiments of the present disclosure, a lighting module circuit comprises a light-emitting unit, a first flicker frequency controller, a second flicker frequency controller, and a communication circuit. The light-emitting unit includes a plurality of light-emitting devices connected in series. The first flicker frequency controller has a first output terminal for outputting a first output signal with a first flicker frequency. The second flicker frequency controller has a second output terminal for outputting a second output signal with a second flicker frequency different from the first flicker frequency. The light-emitting unit is coupled between a power supply terminal for receiving a power supply signal and the second output terminal of the second flicker frequency controller, and the first output terminal of the first flicker frequency controller is coupled to one of the plurality of light-emitting devices of the light-emitting unit. The communication circuit is for communication with a remote device and being coupled to the first flicker frequency controller and the second flicker frequency controller for operation of the light-emitting unit based on information obtained from the remote device.

In some embodiments of the lighting module circuit, the second flicker frequency is lower than the first flicker frequency. In an embodiment, the second flicker frequency is 40 Hz; and the first flicker frequency is greater than 40 Hz.

In some embodiments of the lighting module circuit, the first flicker frequency is lower than the second flicker frequency. In an embodiment, the first flicker frequency is 40 Hz; and the second flicker frequency is greater than 40 Hz.

In some embodiments of the lighting module circuit, the lighting module circuit further comprises a selector circuit having an input selection terminal coupled to the first output terminal of the composite flicker frequency circuit, and a plurality of output selection terminals coupled to respective ones of the plurality of light-emitting devices, wherein the composite flicker frequency circuit controls the selector circuit to output the first output signal to the one of the plurality of light-emitting devices through one of the plurality of output selection terminals.

In some embodiments of the lighting module circuit, the lighting module circuit further comprises a communication circuit for communication with a remote device and being coupled to the composite flicker frequency circuit to output the control information for operation of the light-emitting unit based on information obtained from the remote device.

DETAILED DESCRIPTION OF THE INVENTION

To facilitate understanding of the object, characteristics and effects of this present disclosure, embodiments together with the attached drawings for the detailed description of the present disclosure are provided.

Figure 1:
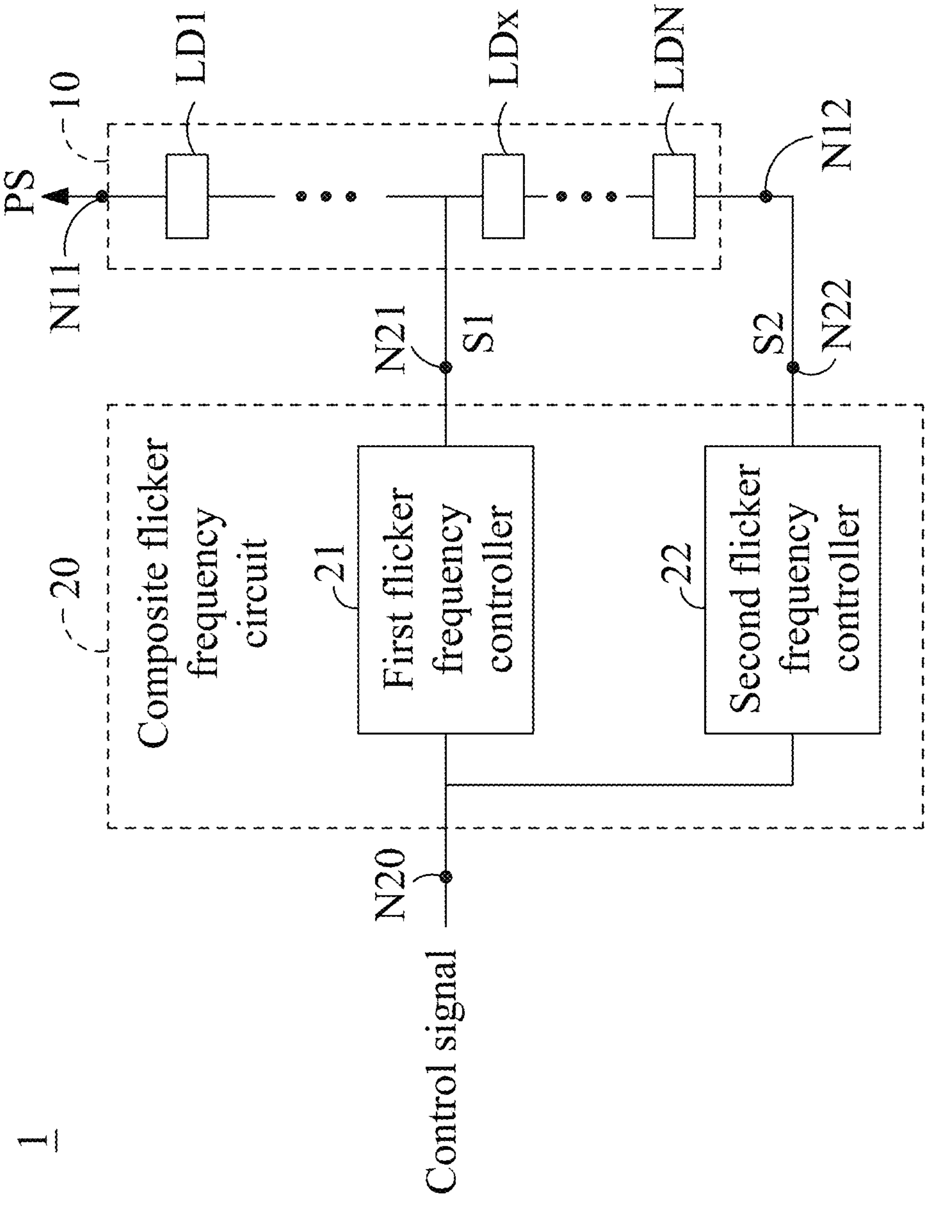
FIG. 1 is a schematic diagram illustrating a lighting module circuit according to an embodiment of the present disclosure.

FIG. 1 illustrates a lighting module circuit according to an embodiment of the present disclosure. As shown in FIG. 1, a lighting module circuit 1 comprises a light-emitting unit 10 and a composite flicker frequency circuit 20. The light-emitting unit 10 includes a plurality of light-emitting devices (e.g., denoted by LD1-LDN, where N is an integer greater than 1) connected in series. The composite flicker frequency circuit 20 has at least one input terminal (e.g., denoted by N20) for receiving control information (e.g., through a control signal indicating the control information), a first output terminal (e.g., denoted by N21) for outputting a first output signal (e.g., denoted by S1) with a first flicker frequency, and a second output terminal (e.g., denoted by N22) for outputting a second output signal (e.g., denoted by S2) with a second flicker frequency different from the first flicker frequency.

The light-emitting unit 10 is coupled between a first terminal N11 and a second terminal N12. For example, the first terminal N11 is coupled to a power supply terminal for receiving a power supply signal PS and the second terminal N12 is coupled to the second output terminal N22 of the composite flicker frequency circuit 20. The first output terminal N21 of the composite flicker frequency circuit 20 is coupled to one (e.g., denoted by LDx) of the plurality of light-emitting devices LD1-LDN of the light-emitting unit 10.

In this manner, the lighting module circuit 1 is capable of controlling a portion or all of the light-emitting devices LD1-LDN to emit light at composite flickering frequencies including the first flicker frequency and the second flicker frequency. The lighting module circuit 1 can control the light-emitting devices LD1-LDN to emit lights at the first and second flickering frequencies with respective intensities for illumination. The illumination with reduced or without flickering can be reached by the entrained composite flickering frequencies. The lighting module circuit 1 can be utilized to provide light stimulation for phototherapy while providing lighting with reduced visual stress, making a lighting device based on the lighting module circuit 1 possible for life, work, or even (e.g., its study, development for future treatment or for treatment equipment.

The lighting module circuit 1 in FIG. 1 can be considered as a circuit architecture for this purpose. Based on this circuit architecture, various embodiments can be provided as below.

In an embodiment, the composite flicker frequency circuit 20 comprises: a first flicker frequency controller 21 and a second flicker frequency controller 22. The first flicker frequency controller 21 is for outputting the first output signal S1 through the first output terminal N21; and the second flicker frequency controller 22 is for outputting the second output signal S2 through the second output terminal N22.

In an embodiment, the second flicker frequency is lower than the first flicker frequency; the second flicker frequency is 40 Hz; and the first flicker frequency is greater than 40 Hz.

In another embodiment, the first flicker frequency is lower than the second flicker frequency; the first flicker frequency is 40 Hz; and the second flicker frequency is greater than 40 Hz.

In some embodiments, the one (e.g., denoted by LDx) of the plurality of light-emitting devices LD1-LDN which is coupled to the first output terminal N21 of the composite flicker frequency circuit 20 is an intermediate one of the plurality of light-emitting devices LD1-LDN. Accordingly, the first output signal S1 can be applied to the intermediate one (LDx) such that a first portion of the light-emitting devices (e.g., from LD1 to the one before LDx) emits light varying in intensity and frequency based on composite flickering frequencies including the first flicker frequency and the second flicker frequency. At the same time, a second portion of the light-emitting devices (e.g., from LDx to LDN) emits light varying in intensity and frequency based on a single flickering frequency, e.g., the second flicker frequency.

In some embodiments, the composite flicker frequency circuit 20 outputs a first current signal varying with the first flicker frequency as the first output signal S1 and a second current signal varying with the second flicker frequency as the second output signal S2.

In some embodiments, the lighting module circuit 1 further comprises a communication circuit (e.g., 300 of FIG. 2) for communication with a remote device and being coupled to the composite flicker frequency circuit 20 to output the control information for operation of the light-emitting unit based on information obtained from the remote device. The communication circuit can be realized by using wired or wireless communication circuits (e.g., infrared, Bluetooth communication circuit) or network communication chips (e.g., a chip compliant with Wi-Fi compliant communication) and so on. The remote device can be a wired or wireless remote controller, or a computing device (e.g., mobile phone, tablet computer, computers or so on).

Figure 2:
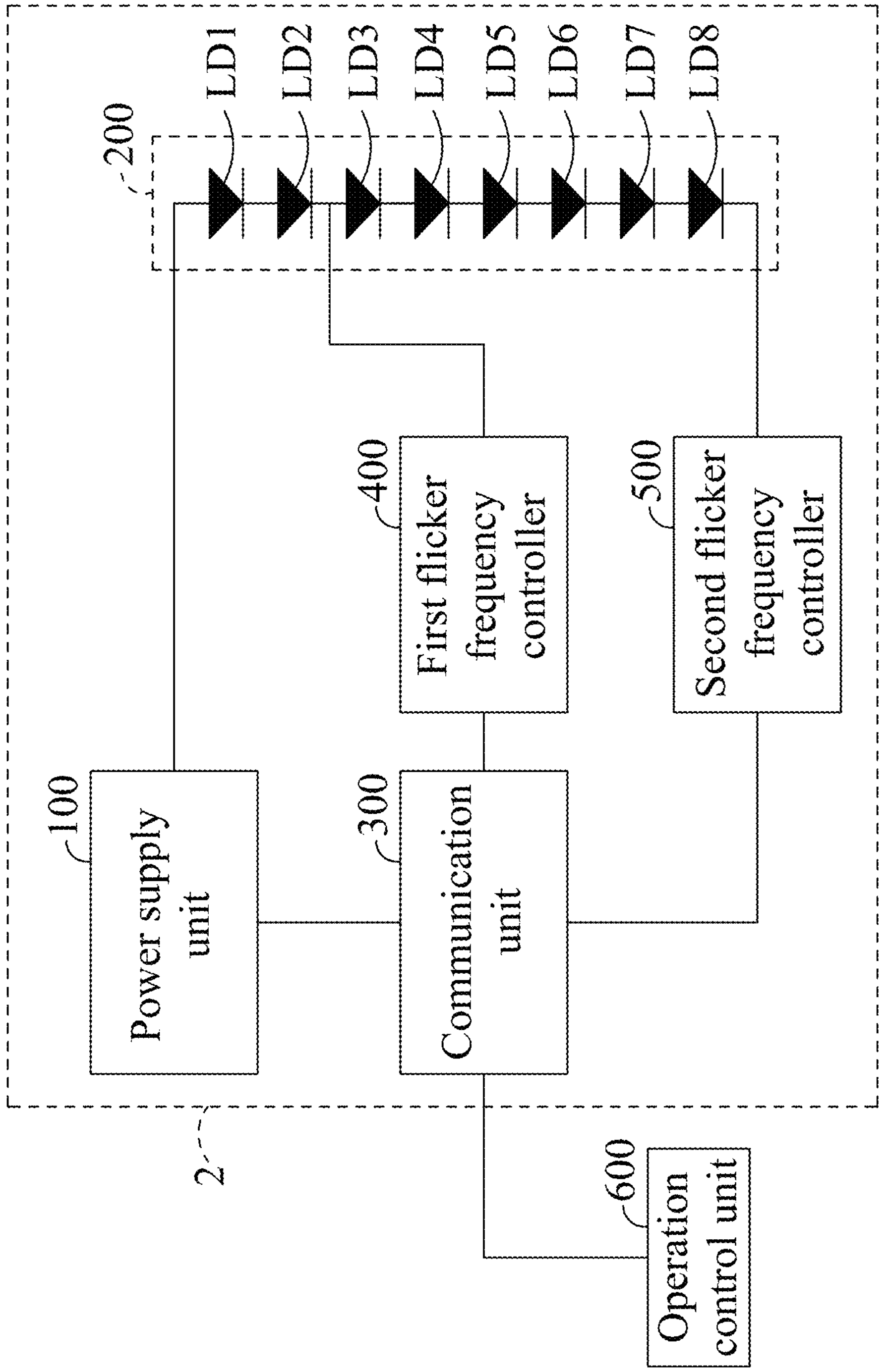
FIG. 2 is a schematic diagram illustrating a lighting module according to an embodiment of the present disclosure.

FIG. 2 is a schematic diagram illustrating a lighting module according to an embodiment of the present disclosure. The lighting module 2 is an embodiment based on the lighting module circuit 1 as shown in FIG. 1. As shown in FIG. 2, a lighting module 2 comprises a light-emitting unit 200, a first flicker frequency controller 400, a second flicker frequency controller 500, and a communication unit 300. The light-emitting unit 200 includes a plurality of light-emitting devices (e.g., light-emitting diodes (LED)) LD1-LD8 connected in series. The implementation of the present disclosure is not limited to the examples. For example, the light-emitting unit 200 can be realized as including more or less LEDs.

The first flicker frequency controller 400 has a first output terminal for outputting a first output signal with a first flicker frequency (e.g. 40 Hz). The second flicker frequency controller 500 has a second output terminal for outputting a second output signal with a second flicker frequency (e.g., 80 Hz or above) greater than the first flicker frequency (e.g. 40 Hz). The first flicker frequency controller 400 or the second flicker frequency controller 500 can be implemented based on pulse-width modulation.

The light-emitting unit 200 is coupled between a power supply unit 100 and the second output terminal of the second flicker frequency controller 500. For example, the power supply unit 100 can be a power adapter, an AC/DC power supply or a battery, and provides DC power to the light-emitting unit 200.

The first output terminal of the first flicker frequency controller 400 is coupled to one (e.g., LD3) of the plurality of light-emitting devices LD1-LD8 of the light-emitting unit 200. For example, the first output terminal of the first flicker frequency controller 400 is coupled to the anode of the light-emitting devices LD3 as shown in FIG. 2, or another light-emitting device such as LD4, LD5, or so on.

The communication unit 300 is used for communication with a remote device (or referred to as an operation control unit 600) and being coupled to the first flicker frequency controller 400 and the second flicker frequency controller 500 for operation of the light-emitting unit 200 based on information obtained from the operation control unit 600. The information may be control information including instructions, parameter setting or selections from a user, or so on. The user may operate the operation control unit 600, for example, to turn on or off a mode for light with composite flickering frequencies, to change the ratio of brightness of some light-emitting devices to emit light with an intensity and a flickering frequency as set, or so on.

Figure 4A:
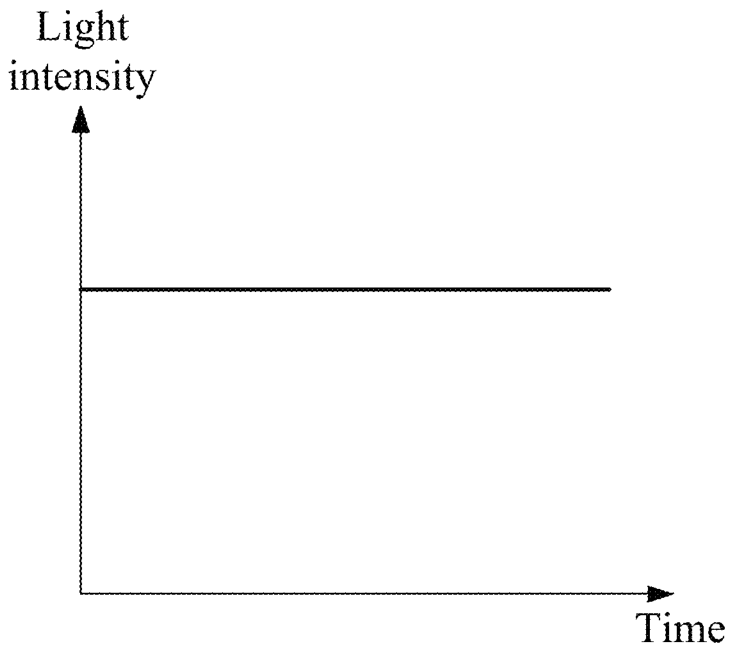
FIG. 4A is a diagram illustrating an example indicating that a light intensity output of a light-emitting unit is all flicker free.

By using the first flicker frequency controller 400 and second flicker frequency controller 500, the lighting module 2 can be configured to enable a portion or all of the light-emitting devices LD1-LD8 to emit lights with an intensity and/or a flickering frequency as set. For example, in FIG. 2, the light-emitting devices LD1-LD2 emit light varying in intensity and frequency based on composite flickering frequencies including the first flicker frequency (e.g. 40 Hz) and the second flicker frequency (e.g., 80, 100, 120 Hz or above). Meanwhile, the light-emitting devices LD3-LD8 emit light varying in intensity and frequency based on a single flickering frequency signal, for example, the second flicker frequency (e.g., 80, 100, 120 Hz or above) to generate a light source with a more stable frequency for the human eyes because the human eyes cannot perceive higher flicker frequencies (e.g., 80, 100, 120 Hz or above). With respect to the human visual perception, the light intensity of the light-emitting devices LD1-LD2 is indicated by a flickering intensity in FIG. 4B based on the first flicker frequency (e.g. 40 Hz) while the light intensity of the light-emitting devices LD3-LD8 may be indicated by a stable intensity in FIG. 4A.

Figure 3:
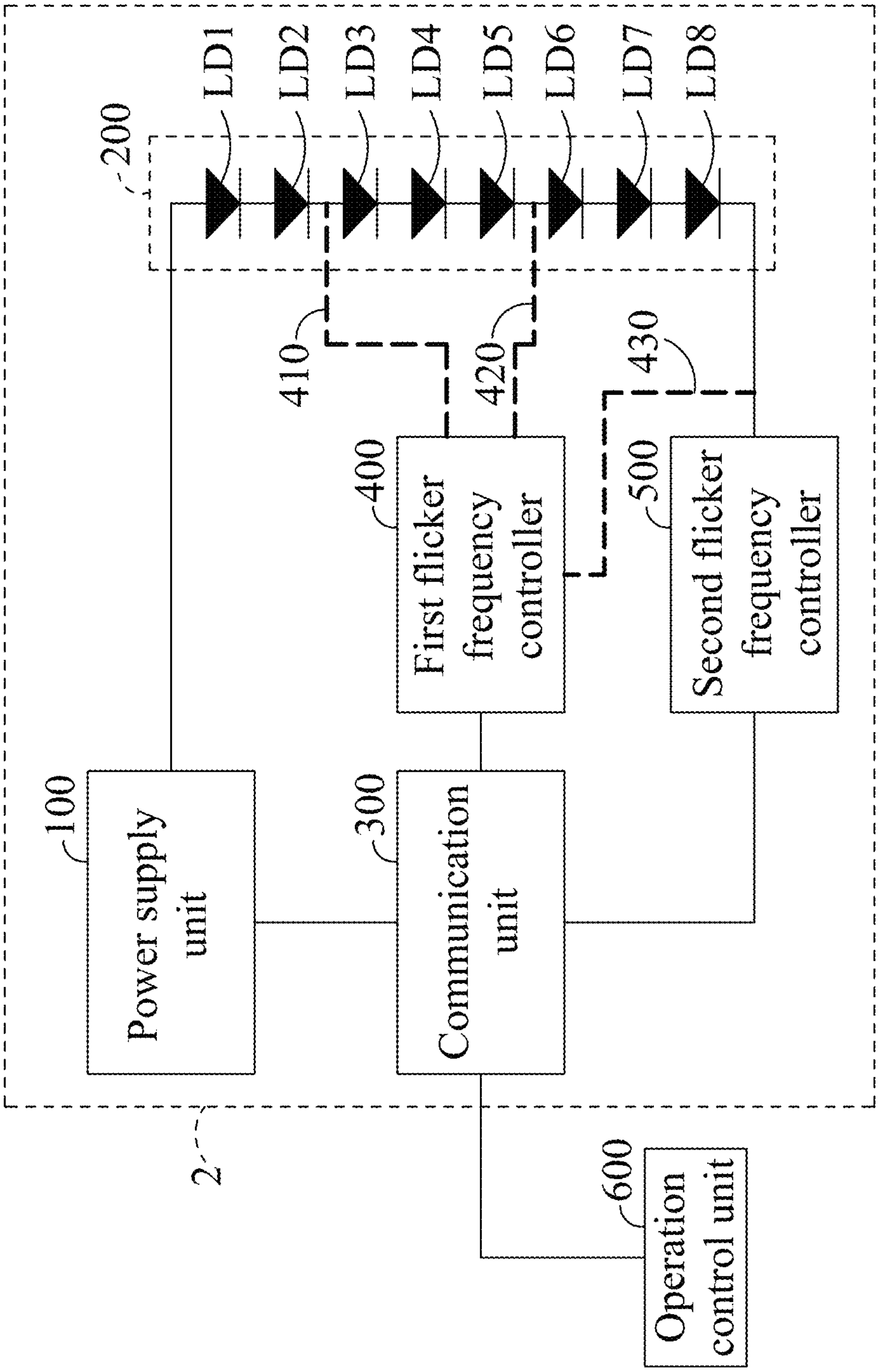
FIG. 3 is a schematic diagram illustrating embodiments of a lighting module as shown in FIG. 2.

As illustrated in FIG. 3, the first output terminal of the first flicker frequency controller 400 can be coupled to the anode of the light-emitting device LD3 or LD6 through a signal path 410 or 420. In an example for a circuit configuration using the signal path 410, the situations of light intensity and flickering are discussed above for FIG. 2. In an example for a circuit configuration using the signal path 420, the light-emitting devices LD1-LD5 emit light varying in intensity and frequency based on the composite flickering frequencies including the first flicker frequency (e.g. 40 Hz) and the second flicker frequency (e.g., 80, 100, 120 Hz or above). Meanwhile, the light-emitting devices LD6-LD8 emit light varying in intensity and frequency based on a single flickering frequency signal, for example, the second flicker frequency (e.g., 80, 100, 120 Hz or above) to generate a light source with a more stable frequency. With respect to the human visual perception, the light intensity of the light-emitting devices LD1-LD5 is indicated by a flickering intensity in FIG. 4C based on the first flicker frequency (e.g. 40 Hz) while the light intensity of the light-emitting devices LD6-LD8 is indicated by a stable intensity in FIG. 4A.

In addition, as shown in FIG. 3, the first output terminal of the first flicker frequency controller 400 can be coupled to the cathode of the light-emitting device LD8 through a signal path 430. In this manner, all the light-emitting devices LD1-LD8 emit light varying in intensity and frequency based on the composite flickering frequencies. In this case, with respect to the human visual perception, the light intensity of the light-emitting unit 200 can be indicated by a flickering intensity as illustrated in FIG. 4B, 4C, or 4D.

Further, the lighting module 2 can also be configured to turn off the first flicker frequency controller 400 and turn on the second flicker frequency controller 500 so that all of the light-emitting devices LD1-LD8 emit light varying in intensity and frequency based on the single flickering frequency. In this case, with respect to the human visual perception, the light intensity of the light-emitting unit 200 can be indicated by a stable intensity in FIG. 4A. Further, in an example in which the second flicker frequency controller 500 outputs the second output signal based on pulse-width modulation, adjustment on the duty cycle of the second output signal serves as adjustment on brightness of the light-emitting unit 200 (or regarding a type of dimming control). The dimming control functionality of the second flicker frequency controller 500 (or a flicker frequency controller which can output an output signal with a lower flickering frequency (e.g., 40 Hz) in the circuit architecture of FIG. 1) also works in other circuit configurations (e.g., with respect to the signal path 410, 420, 430, or any appropriate one).

As above discussed, FIGS. 4A, 4B, 4C, and 4D show that various circuit configurations or control methods (regarding changing setting for light intensity and/or flickering frequency) have different brightness performance.

Figure 4B:
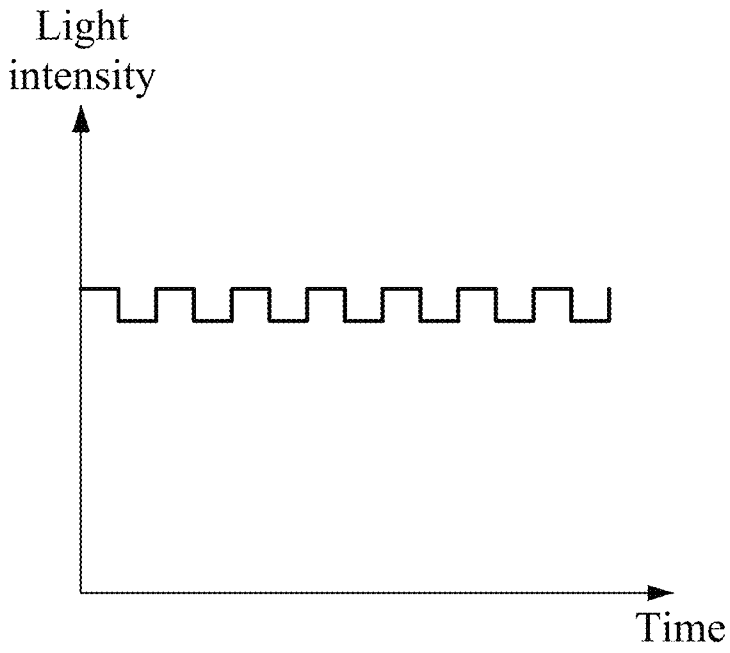
FIG. 4B is a diagram illustrating an example of a light intensity output of flickering at a frequency.
Figure 4C:
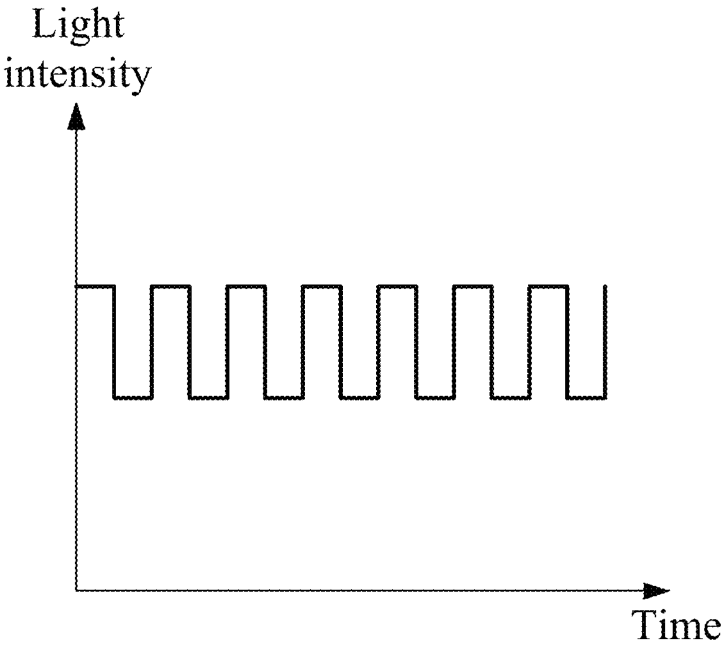
FIG. 4C is a diagram illustrating an example of a light intensity output of flickering at a frequency.
Figure 4D:
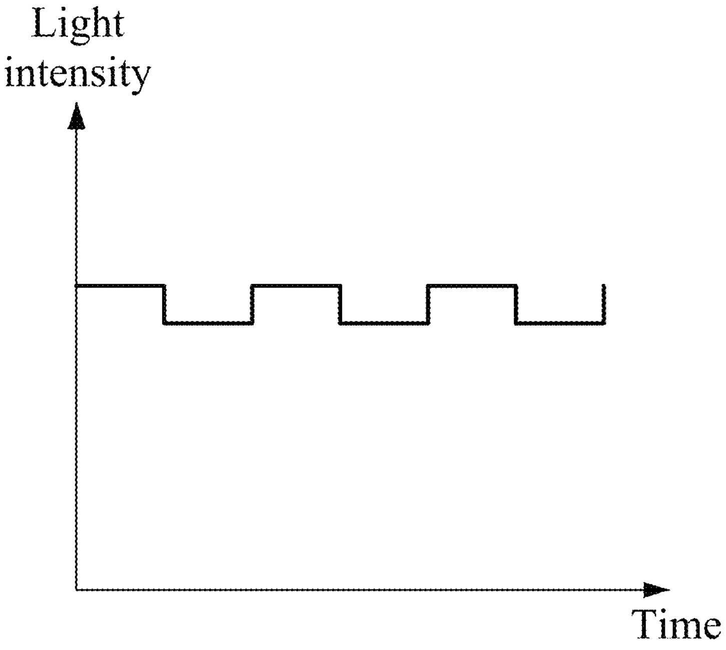
FIG. 4D is a diagram illustrating an example of a light intensity output of flickering at a frequency.

As indicated by FIG. 4B and FIG. 4C, the total light intensity of the light emitted by the lighting module 2 can be configured by changing the total brightness ratio of a portion of light-emitting devices varying under a same flickering frequency.

Figure 4E:
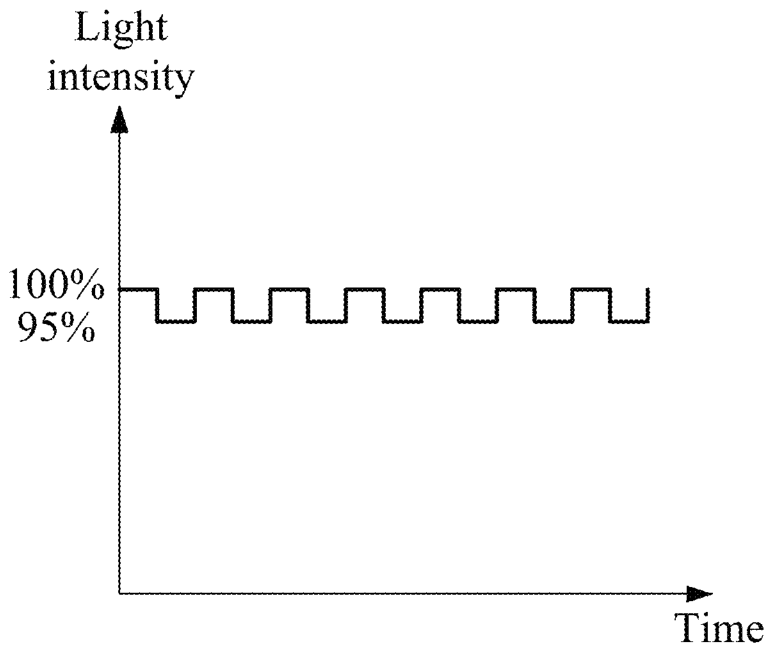
FIG. 4E is a diagram illustrating an example of a light intensity output of flickering at a frequency.

For example, in different scenarios, such as work or daily life, a reduction in the ratio of the light-emitting devices whose light intensity varies based on a first flickering frequency (e.g., 40 Hz) in the lighting module 2 enables the lighting module 2 to make a lighting environment more comfortable for the human eyes. In this manner, for example, FIG. 4E illustrates that the flickering portion of the light intensity of the lighting module 2 can be adjusted within a smaller range (e.g., 5% (=100%-95%) or less) of the total light intensity, for the sake of comfort of the human eyes, reducing visual stress.

Figure 4F:
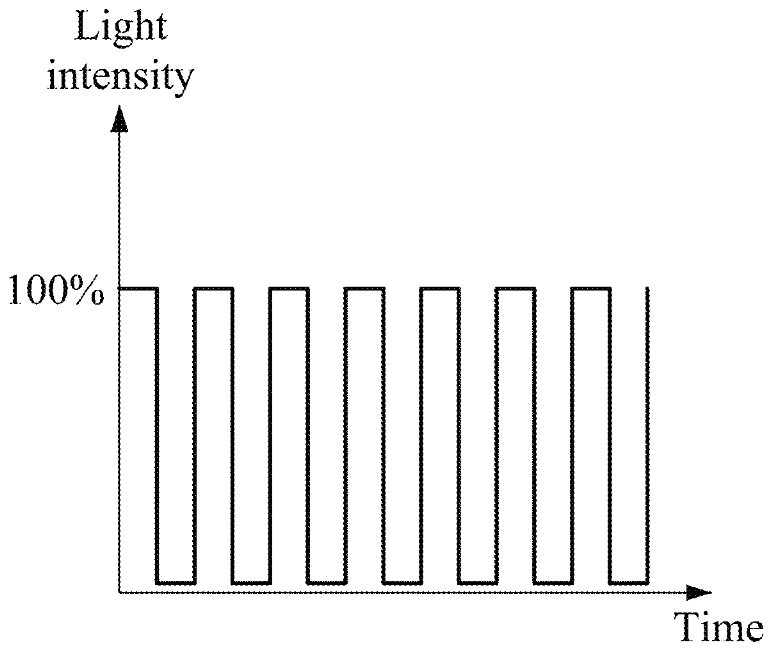
FIG. 4F is a diagram illustrating an example of a light intensity output of flickering at a frequency.

In scenarios of phototherapy stimulation, an increase in the ratio of the light-emitting devices whose light intensity varies based on a first flickering frequency (e.g., 40 Hz) in the lighting module 2 enables the lighting module 2 to emit light to achieve higher stimulation intensity. In this manner, for example, FIG. 4F illustrates that the flickering portion of the light intensity of the lighting module 2 can be adjusted within a larger range (e.g., 98% (=100%-2%)) of the total light intensity.

In an embodiment, changing the ratio of the light-emitting devices whose light intensity varies based on a first flickering frequency (e.g., 40 Hz) in the lighting module 2 can be done by implementation of at least one signal path (e.g., 410, 420, or 430 as shown in FIG. 2) which is selectable by a switch manually or electronically controlled. Following this approach, another embodiment of a lighting module circuit based on FIG. 1 is illustrated in FIG. 5.

Figure 5:
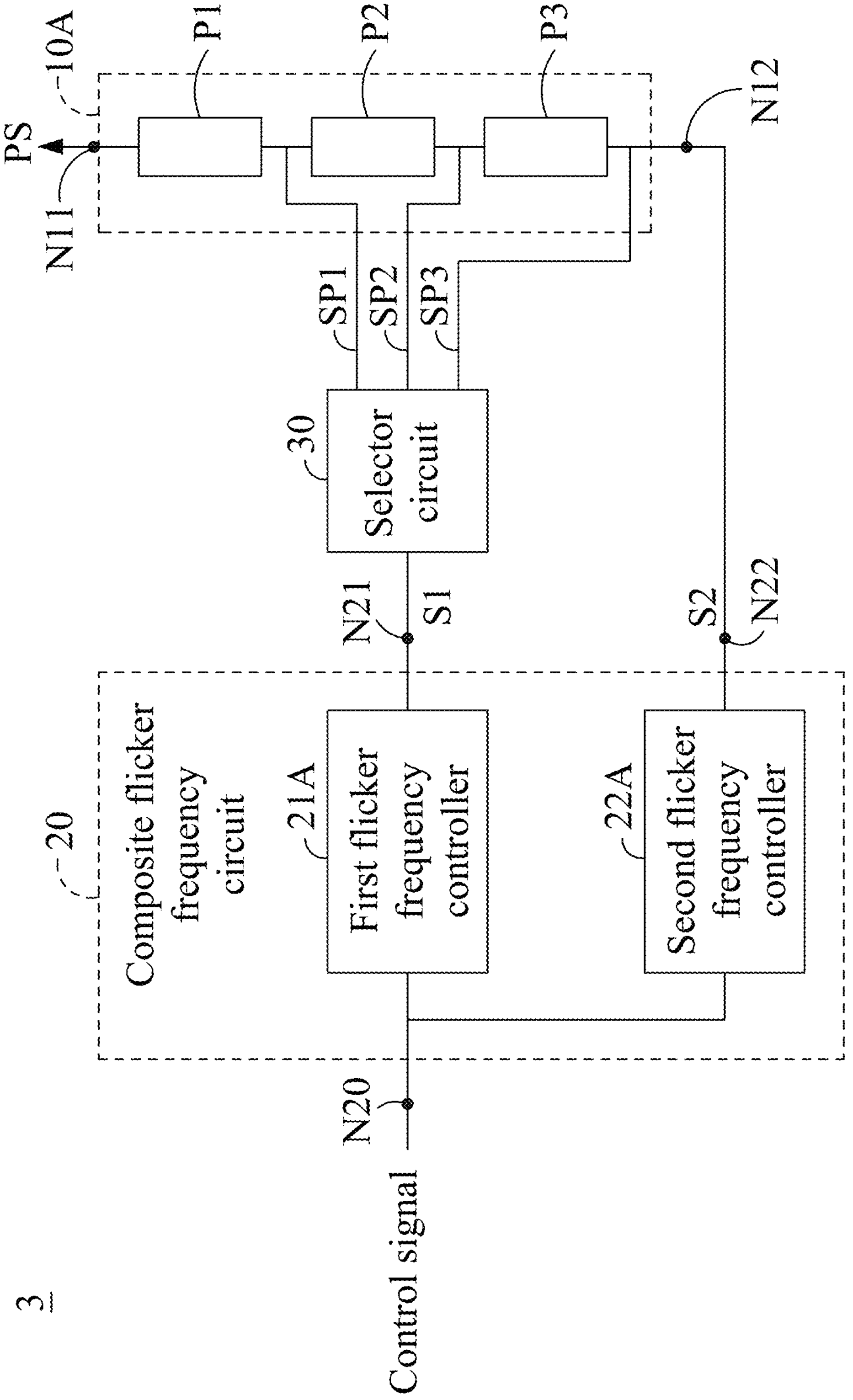
FIG. 5 is a schematic diagram illustrating a lighting module circuit according to another embodiment of the present disclosure.

FIG. 5 illustrates a lighting module circuit according to another embodiment of the present disclosure. As shown in FIG. 5, a lighting module circuit 3 comprises a light-emitting unit 10A, a composite flicker frequency circuit 20A, and a selector circuit 30. As compared with the lighting module circuit 1 in FIG. 1, the lighting module circuit 3 further comprises the selector circuit 30. The light-emitting unit 10A and the composite flicker frequency circuit 20A can be considered as embodiments of those counterparts as shown in FIG. 1 or FIG. 2. The embodiments of those counterparts as shown in FIG. 1 or FIG. 2 can be applied to the present embodiment, whenever appropriate.

In an embodiment, the selector circuit 30 has an input selection terminal coupled to a first output terminal S1 of the composite flicker frequency circuit 20A, and a plurality of output selection terminals coupled to respective ones of a plurality of light-emitting devices of the light-emitting unit 10A. The composite flicker frequency circuit 20A controls the selector circuit 30 to output the first output signal to one of the plurality of light-emitting devices of the light-emitting unit 10A through one of the plurality of output selection terminals. The selector circuit 30, for example, can be implemented by using a multiplexer, switching devices, switches, or so on.

In FIG. 5, the selector circuit 30 has three output selection terminals coupled to three nodes of serially-connected light-emitting devices (e.g., 10 in FIG. 1; 200 in FIG. 2) of the light-emitting unit 10A through three signal paths SP1, SP2, and SP3, respectively. By controlling the selector circuit 30, the first output signal S1 is selectively applied to the corresponding node of the light-emitting unit 10A. For example, when the signal path SP1 is selected, a portion (denoted by P1) of the plurality of light-emitting devices of the light-emitting unit 10A emits light varying in intensity and frequency based on the composite flickering frequencies including the first and the second flicker frequencies while portions P2 and P3 of the plurality of light-emitting devices of the light-emitting unit 10A emit light varying in intensity and frequency based on a single flickering frequency, for example, the second flicker frequency. When the signal path SP2 is selected, the portions P1 and P2 of the plurality of light-emitting devices of the light-emitting unit 10A emit light varying in intensity and frequency based on the composite flickering frequencies while the portion P3 of the plurality of light-emitting devices of the light-emitting unit 10A emit light varying in intensity and frequency based on the single flickering frequency. In this manner, the ratio of the light-emitting devices whose light intensity varies based on the first flickering frequency (e.g., 40 Hz) in the lighting module 3 can be changed selectively.

Thus, the circuit architecture of the lighting module circuit 3 provides more flexibility on adjusting or configuring the ratio of the light-emitting devices whose light intensity varies based on the first flickering frequency (e.g., 40 Hz).

Figure 6:
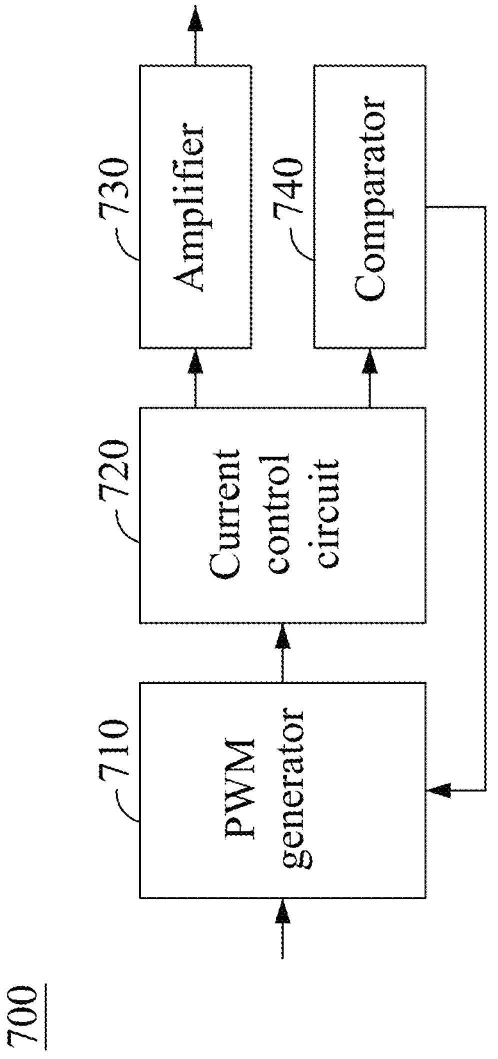
FIG. 6 is a schematic diagram illustrating an embodiment of a flickering frequency controller.

FIG. 6 illustrates an embodiment of a flickering frequency controller. As shown in FIG. 6, a flickering frequency controller 700 includes a pulse-width modulation (PWM) generator 710, a current control unit 720, an amplifier 730, and a comparator 740. The PWM generator 710 receives a control signal and outputs a PWM signal at a flickering frequency according to the control signal, wherein the control signal may indicate a value corresponding to a duty cycle of the PWM signal. The current control unit 720 outputs a first signal and a second signal according to the PWM signal. The amplifier 730 amplifies the first signal from the current control unit 720 as an output signal of the flickering frequency controller 700 for applying to a light-emitting device. The comparator 740 receives the second signal and outputs a feedback signal to the PWM generator 710. In FIG. 6, the PWM generator 710 performs pulse width modulation and the current control unit 720 converts a current signal into a voltage signal. The voltage and current signals are synchronized through the amplifier 730 and comparator 740 and a feedback signal is fed back to the PWM generator 710. This circuit approach shown in FIG. 6 can be applied to implement the flickering frequency controller or circuit (e.g., 20 in FIG. 1 or FIG. 5; or 400, 500 in FIGS. 2-3). By using the composite flickering frequency circuit, a string of LEDs can be utilized for lighting at composite frequencies at the same time with reduced or without flickering.

In some embodiments, a flickering frequency controller can be implemented by using an amplifier, comparators, feedback controller, buck-boost controllers, constant current controllers, linear voltage regulators and PWM generators.

In some embodiments, a flickering frequency controller 700 can also be implemented as a flickering frequency variable circuit, for example, through an adjustable resistor or other adjustable electronic components. Such flexibility of changing the flickering frequency in particular the lower flickering frequency (such as 40 Hz) is expected to be useful in the development of future phototherapy; and different flickering frequencies can continue to verify the health improvement effects.

In addition to 40 Hz light flicker having positive effects on human brains, it is known that when exposed to flickering frequencies in the 3-7 Hz range, patients were observed to easily enter a hypnotic state. In addition, an experimental group received audio-visual stimulation using a sound and light stimulator set to an alpha frequency of 10 Hz for fifteen minutes. This group exhibited a significant increase in relaxation and reached a state of complete relaxation. Regarding the lighting module circuit, a variable flickering frequency light can be useful for such studies. By adjusting the flicker rate within specific frequency ranges (such as alpha or theta frequencies), researchers can explore its impact on brain states, relaxation, and hypnotic effects.

Figure 7:
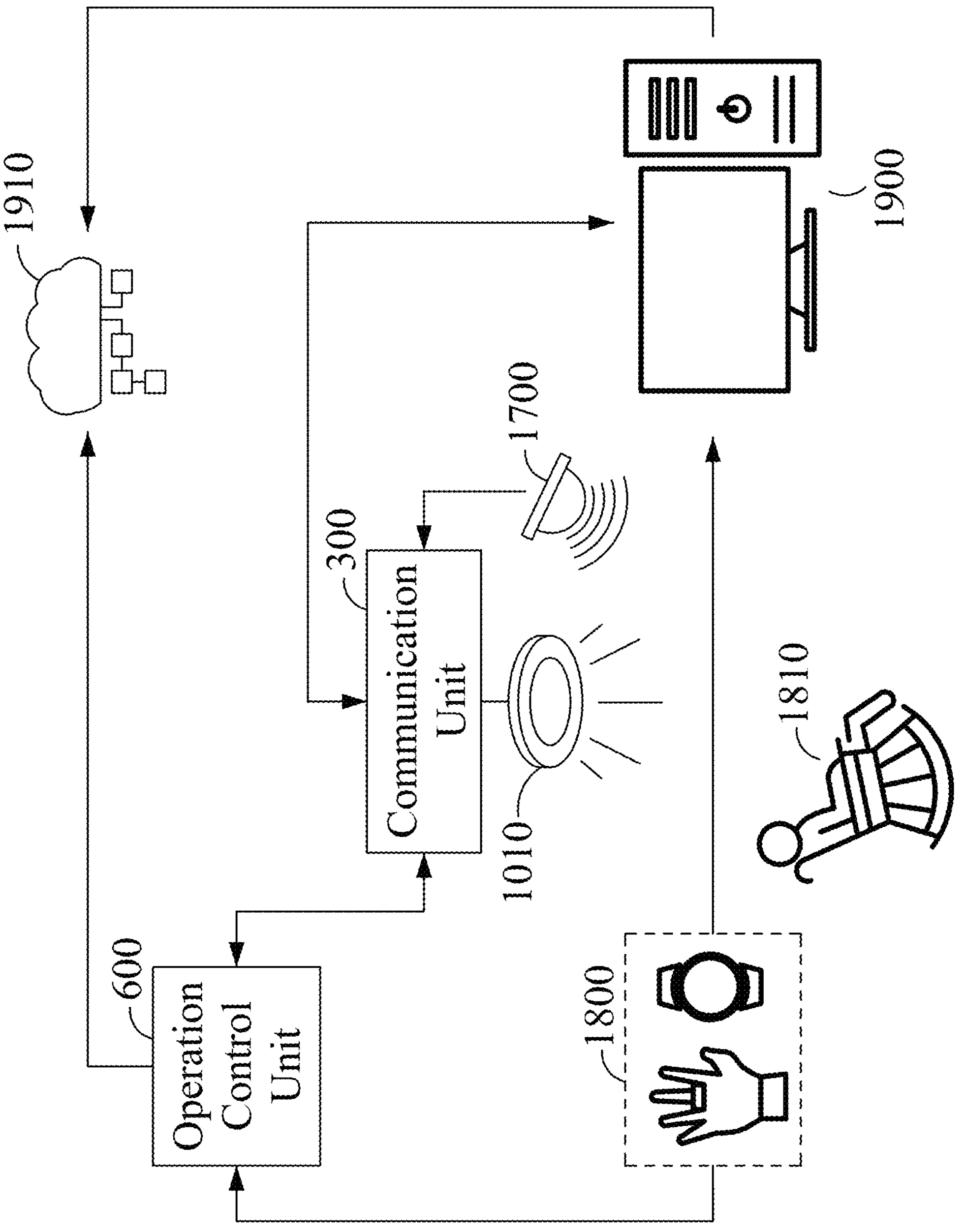
FIG. 7 is a schematic diagram illustrating an embodiment of a system for phototherapy using a lighting device.

FIG. 7 illustrates an embodiment of a phototherapy system using a lighting device. In FIG. 7, a lighting device 1010 can be assembled with a circuit board of a lamp board and a mechanical structure of the lamp. The lighting device 1010 (or referred to as a lamp) is a downlight with a shell, and the lamp shell can be a downlight, lamps, spotlight, ceiling light, bulb and other types. The lighting device 1010 is based on FIG. 1 or FIG. 2 with a communication unit 300 which is connected to the operation control unit 600 in a wired or wireless manner, including but not limited to Bluetooth, Wi-Fi, Bluetooth Mesh, infrared remote control, 2.4G wireless remote control, wired switch, or so on. The operation control unit 600 can be connected to a control system 1900 (e.g., a computing device) using a mobile device application, panel control or remote control, or using a wired interface including but not limited to RJ-45, RS-232, or so on.

The communication unit 300 in the lighting device 1010 can be externally connected to a sensing device 1700. The lighting device 1010 can be configured to activate its lighting function and/or flickering frequency stimulation function in response to a user 1810 entering an illuminated area, wherein the sensing device 1700 can detect the presence or absence of human with the illuminated area and informs the lighting device 1010 of the detection results. The communication unit 300 can transmit usage status (e.g., time of daily usage, flickering frequency usage, or so on) to the operation control unit 600 and record the stimulation frequency and usage time. The user 1810 can also transmit the data of the lighting device 1010 or an external vital sign device 1800 (e.g., a smart ring or smart watch) for the user 1810 to a cloud database device 1910 through an operation control unit 600 or a control system 1900 for storage. Through trend analysis and comparison of the data and subsequent diagnostic testing of the user 1810, the setting parameters of the phototherapy system can be gradually optimized to achieve better results.

Accordingly, the embodiments of the present disclosure provide a lighting module circuit that can provide users with a stimulation effect by light at a flickering frequency in addition to basic functionality of lighting, reducing visual stress and without interference with the users' daily life. The circuit architecture of the lighting module circuit is used to cause some or all of a plurality of light-emitting devices to flash at a specific frequency. The communication unit can optionally communicate with an operation control unit or a local system to adjust the light intensity provided by the lighting module circuit. Integrated with time data, the improvement effect achieved by users through frequency stimulation can be tracked and compared.

While the present disclosure has been described by means of specific embodiments, numerous modifications and variations could be made thereto by those skilled in the art without departing from the scope and spirit of the present disclosure set forth in the claims.

What is claimed is:

1. A lighting module circuit comprising:

a light-emitting unit including a plurality of light-emitting devices connected in series;

a composite flicker frequency circuit having at least one input terminal for receiving control information, having a first output terminal for outputting a first output signal with a first flicker frequency, and a second output terminal for outputting a second output signal with a second flicker frequency different from the first flicker frequency, wherein the light-emitting unit is coupled between a power supply terminal for receiving a power supply signal and the second output terminal of the composite flicker frequency circuit, and the first output terminal of the composite flicker frequency circuit is coupled to one of the plurality of light-emitting devices of the light-emitting unit; and a selector circuit having an input selection terminal coupled to the first output terminal of the composite flicker frequency circuit, and a plurality of output selection terminals coupled to respective ones of the plurality of light-emitting devices, wherein each of the output selection terminals is directly connected to a cathode of a respective one of the plurality of light-emitting devices of the light-emitting unit:

wherein the composite flicker frequency circuit controls the selector circuit to output the first output signal to the one of the plurality of light-emitting devices through one of the plurality of output selection terminals.

2. The lighting module circuit according to claim 1, wherein the composite flicker frequency circuit comprises:

a first flicker frequency controller for outputting the first output signal through the first output terminal; and a second flicker frequency controller for outputting the second output signal through the second output terminal.

3. The lighting module circuit according to claim 1, wherein the second flicker frequency is lower than the first flicker frequency.

4. The lighting module circuit according to claim 3, wherein the second flicker frequency is 40 Hz and the first flicker frequency is greater than 40 Hz.

5. The lighting module circuit according to claim 1, wherein the first flicker frequency is lower than the second flicker frequency.

6. The lighting module circuit according to claim 5, wherein the first flicker frequency is 40 Hz and the second flicker frequency is greater than 40 Hz.

7. The lighting module circuit according to claim 1, wherein the composite flicker frequency circuit outputs a first current signal varying with the first flicker frequency as the first output signal and a second current signal varying with the second flicker frequency as the second output signal.

8. The lighting module circuit according to claim 1, wherein the one of the plurality of light-emitting devices which is coupled to the first output terminal of the composite flicker frequency circuit is an intermediate one of the plurality of light-emitting devices such that a first portion of the light-emitting devices emits light varying in intensity and frequency based on composite flickering frequencies including the first flicker frequency and the second flicker frequency, and a second portion of the light-emitting devices emits light varying in intensity and frequency based on a single flickering frequency of the second flicker frequency.

9. The lighting module circuit according to claim 1, wherein the composite flicker frequency circuit controls the light-emitting devices to emit lights at the first and second flickering frequencies with respective intensities for illumination.

10. The lighting module circuit according to claim 1, wherein further comprising:

a communication circuit for communication with a remote device and being coupled to the composite flicker frequency circuit to output the control information for operation of the light-emitting unit based on information obtained from the remote device.

11. A lighting module circuit comprising:

a light-emitting unit including a plurality of light-emitting devices connected in series;

a composite flicker frequency circuit including a first flicker frequency controller having a first output terminal for outputting a first output signal having a first flicker frequency; and a second flicker frequency controller having a second output terminal for outputting a second output signal having a second flicker frequency different from the first flicker frequency, wherein the light-emitting unit is coupled between a power supply terminal and the second output terminal of the second flicker frequency controller, and the first output terminal of the first flicker frequency controller is coupled to one of the plurality of light-emitting devices of the light-emitting unit;

a communication circuit for communication with a remote device and being coupled to the first flicker frequency controller and the second flicker frequency controller for operation of the light-emitting unit based on information obtained from the remote device; and a selector circuit having an input selection terminal coupled to the first output terminal, and a plurality of output selection terminals coupled to respective ones of the plurality of light-emitting devices, wherein each of the output selection terminals is directly connected to a cathode of a respective one of the plurality of light-emitting devices of the light-emitting unit:

wherein the composite flicker frequency circuit controls the selector circuit to output the first output signal to the one of the plurality of light-emitting devices through one of the plurality of output selection terminals.

12. The lighting module circuit according to claim 11, wherein the second flicker frequency is lower than the first flicker frequency.

13. The lighting module circuit according to claim 12, wherein the second flicker frequency is 40 Hz and the first flicker frequency is greater than 40 Hz.

14. The lighting module circuit according to claim 11, wherein the first flicker frequency is lower than the second flicker frequency.

15. The lighting module circuit according to claim 14, wherein the first flicker frequency is 40 Hz and the second flicker frequency is greater than 40 Hz.

16. The lighting module circuit according to claim 11, wherein the first flicker frequency controller and the second flicker frequency controller control the light-emitting devices to emit lights at the first and second flickering frequencies with respective intensities for illumination.

* * * * *